(12) United States Patent
Watarai et al.

(10) Patent No.: US 8,137,223 B2
(45) Date of Patent: Mar. 20, 2012

(54) BICYCLE REAR DERAILLEUR

(75) Inventors: Etsuyoshi Watarai, Izumi (JP); Takeshi Takachi, Kawachinagano (JP)

(73) Assignee: Shimano Inc., Osaka (JP)

( * ) Notice: Subject to any disclaimer, the term of this patent is extended or adjusted under 35 U.S.C. 154(b) by 538 days.

(21) Appl. No.: 12/274,589

(22) Filed: Nov. 20, 2008

(65) Prior Publication Data
US 2009/0098963 A1 Apr. 16, 2009

(51) Int. Cl.
*F16H 7/22* (2006.01)

(52) U.S. Cl. .............. 474/110; 474/80; 474/81; 474/82; 280/260

(58) Field of Classification Search .............. 474/70, 474/80, 81, 82, 69, 101, 110; 280/238, 236, 280/259, 260
See application file for complete search history.

(56) References Cited

U.S. PATENT DOCUMENTS

| | | | | |
|---|---|---|---|---|
| 6,162,140 | A * | 12/2000 | Fukuda | 474/70 |
| 6,740,003 | B2 * | 5/2004 | Fukuda | 477/78 |
| 6,945,888 | B2 | 9/2005 | Fukuda et al. | |
| 6,997,835 | B2 * | 2/2006 | Fukuda | 474/82 |
| 7,285,064 | B2 * | 10/2007 | Ichida et al. | 474/80 |
| 7,290,458 | B2 | 11/2007 | Fukuda | |
| 7,585,237 | B2 * | 9/2009 | Fukuda | 474/80 |
| 7,942,768 | B2 * | 5/2011 | Takamoto et al. | 474/82 |
| 2002/0082128 | A1 | 6/2002 | Fukuda | |
| 2003/0092519 | A1 * | 5/2003 | Fukuda | 474/70 |
| 2003/0207732 | A1 * | 11/2003 | Fukuda | 474/80 |
| 2004/0043850 | A1 | 3/2004 | Ichida et al. | |
| 2004/0102270 | A1 | 5/2004 | Fukuda | |
| 2004/0116222 | A1 | 6/2004 | Shahana et al. | |
| 2005/0187048 | A1 * | 8/2005 | Fukuda | 474/70 |
| 2005/0187050 | A1 * | 8/2005 | Fukuda | 474/80 |
| 2005/0239587 | A1 * | 10/2005 | Ichida et al. | 474/82 |
| 2006/0100045 | A1 * | 5/2006 | Fukuda | 474/70 |
| 2006/0105869 | A1 * | 5/2006 | Fukuda | 474/80 |
| 2006/0183584 | A1 * | 8/2006 | Fukuda | 474/70 |
| 2007/0175290 | A1 * | 8/2007 | Fujii | 74/502.2 |
| 2007/0205574 | A1 * | 9/2007 | Guderzo et al. | 280/261 |

FOREIGN PATENT DOCUMENTS

| | | |
|---|---|---|
| TW | I-247711 B | 1/2006 |
| TW | I-274879 B | 3/2007 |

OTHER PUBLICATIONS

English Translation of Office Action of corresponding Taiwan Application No. 098107575 dated Aug. 26 2011.

* cited by examiner

*Primary Examiner* — Emmanu M Marcelo
(74) *Attorney, Agent, or Firm* — Global IP Counselors, LLP (57) ABSTRACT

A bicycle rear derailleur is provided with a base member, a movable member, a moving mechanism and an angular adjustment arrangement. The base member includes a first support portion and a first axle with the first support portion being pivotally mounted on the first axle. The movable member includes a second support portion, a chain guide and a second axle with the chain guide being pivotally mounted on the second support portion by the second axle. The moving mechanism is coupled between the first and second support portions. The angular adjustment arrangement is operatively coupled to either electrically pivot the first support portion relative to the first axle, or electrically pivot the chain guide relative to the second support portion when the moving mechanism is moved to move the second support portion of the movable member relative to the first support portion of the base member.

17 Claims, 10 Drawing Sheets

| REAR GEAR POSITION | BASE MEMBER POSITION | CHAIN GUIDE POSITION |
|---|---|---|
| 1 | A | a |
| 2 | B | b |
| 3 | C | c |
| 4 | D | d |
| 5 | E | e |
| 6 | F | f |
| 7 | G | g |

BICYCLE REAR DERAILLEUR

BACKGROUND OF THE INVENTION

1. Field of the Invention

This invention generally relates to a bicycle rear derailleur. More specifically, the present invention relates to a bicycle rear derailleur that adjusts an angular position of the base member and/or an angular position of the chain guide when the bicycle rear derailleur is shifted.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, the bicycle transmission has been significantly changed over the years.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleur transmissions were manually controlled by a hand operated actuator such as a lever or twist-grip attached to the bicycle handlebar, wherein the derailleur is connected to the actuator by a Bowden cable.

Recently, bicycles have been equipped with electrical components to make riding easier and more enjoyable for the rider. Some bicycles are equipped with electrically controlled shifting systems. In particular, in theses electrically controlled shifting systems, the front and rear derailleurs are provided with motors that laterally move the chain guide to obtain the various gear positions. In the case of a rear derailleur, the angular position of the base member with respect to the frame and the angular position of the chain guide with respect to the movable member are adjusted during a gear changing operation by a pair of springs. While this arrangement generally works quite well, the required adjustment amount for each gear can vary such that the angular positions of the base member and the chain guide will not be optimal for each of the gears.

In view of the above, it will be apparent to those skilled in the art from this disclosure that there exists a need for an improved bicycle rear derailleur. This invention addresses this need in the art as well as other needs, which will become apparent to those skilled in the art from this disclosure.

SUMMARY OF THE INVENTION

One object of the present invention is to provide a bicycle rear derailleur that that can accurately adjusts an angular position of the base member and/or an angular position of the chain guide when the bicycle rear derailleur is shifted.

The foregoing object can basically be attained by providing a bicycle rear derailleur that basically comprises a base member, a movable member, a moving mechanism and an angular adjustment arrangement. The base member includes a first support portion and a first axle with the first support portion being pivotally mounted on the first axle. The movable member includes a second support portion, a chain guide and a second axle with the chain guide being pivotally mounted on the second support portion by the second axle. The moving mechanism is coupled between the first and second support portions. The angular adjustment arrangement is operatively coupled to either electrically pivot the first support portion relative to the first axle, or electrically pivot the chain guide relative to the second support portion when the moving mechanism is moved to move the second support portion of the movable member relative to the first support portion of the base member.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
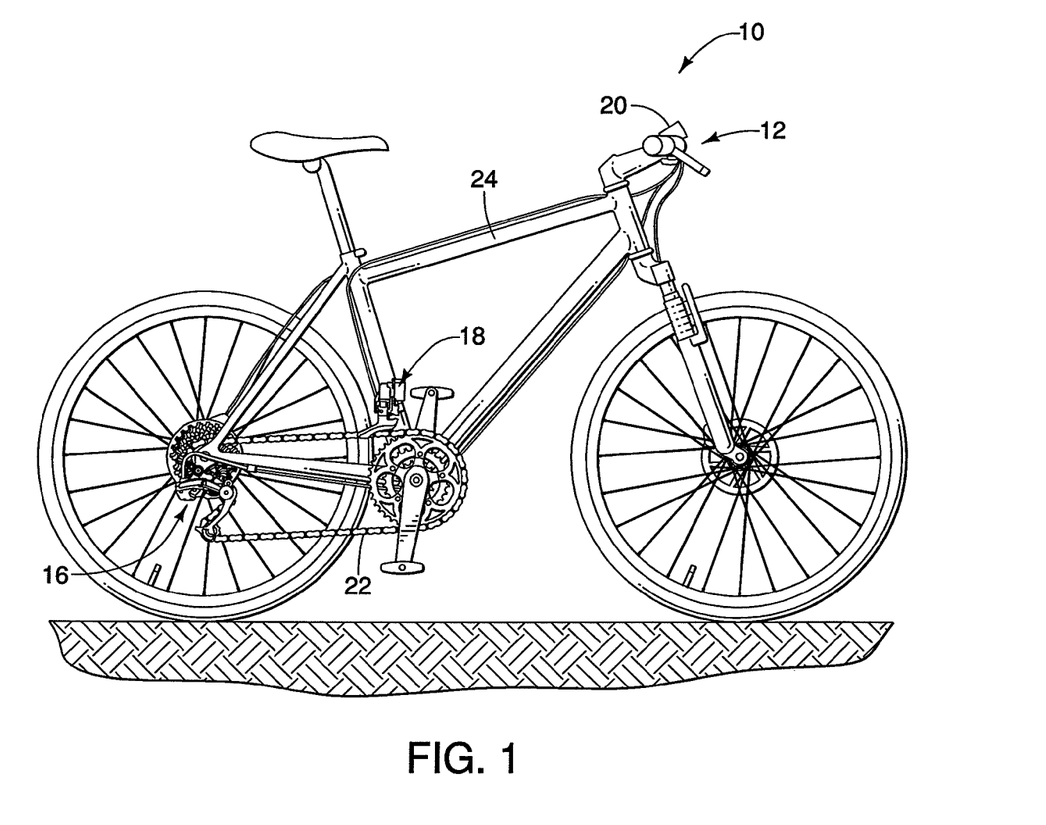
FIG. 1 is a side elevational view of a bicycle that is equipped with a bicycle rear derailleur in accordance with one embodiment.
Figure 2:
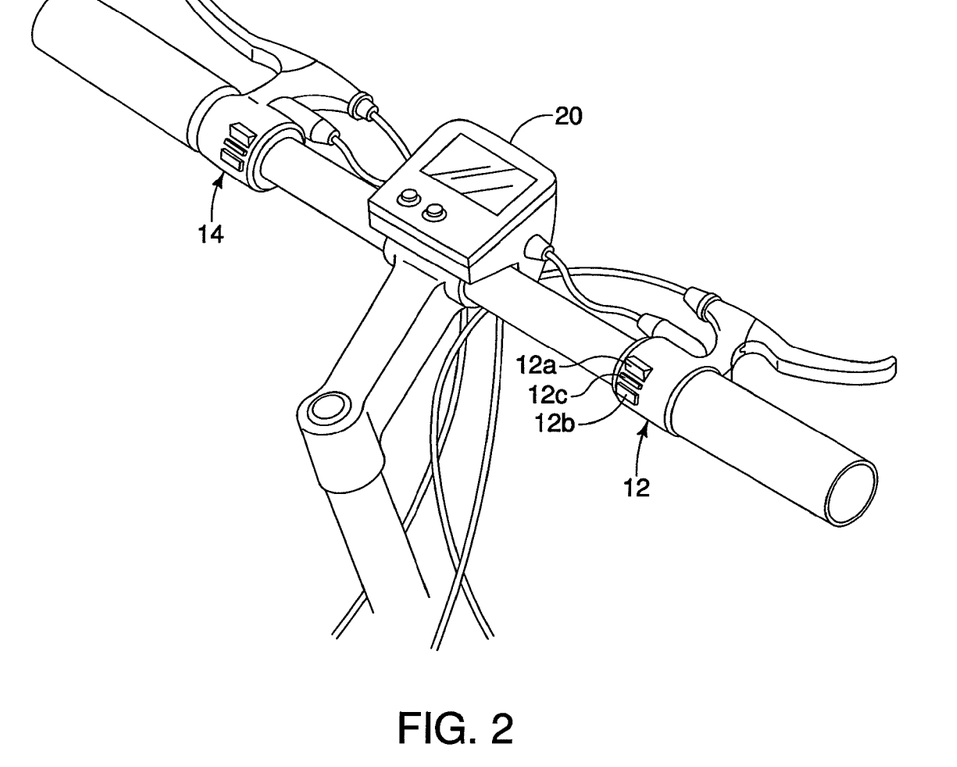
FIG. 2 is a perspective view of the handlebar area of the bicycle illustrated in FIG. 1, with a pair of control devices mounted to a straight type of handlebar.

Referring initially to FIG. 1, a bicycle 10 is illustrated that is equipped with an electronic shifting system in accordance with a first embodiment. As seen in FIGS. 1 and 2, the electronic shifting system basically includes a right hand side control device 12, a left hand side control device 14, a motorized rear derailleur 16, a motorized front derailleur 18 and an electronic controller 20 with a microcomputer. Other than the electronic shifting system, as explained below, the bicycle 10 can be any type of bicycle. Thus, the parts of the bicycle 10 will not be discussed herein, except for those parts that will assist in the understating of the electronic shifting system, in particular, the rear derailleur 16.

As seen in FIG. 2, the right hand side control device 12 is a rear electronic shifter that is preferably provided with a rear derailleur downshift switch 12a, a rear derailleur upshift switch 12b and a rear derailleur mode switch 12c. These switches 12a to 12c are push button type switches that are operatively coupled to the electronic controller 20. The switches 12a and 12b constitute an input part for inputting gear shift commands and calibration commands, while the switch 12c constitutes an input part for inputting mode commands. The rear derailleur downshift switch 12a is normally used for downshifting the rear derailleur 16, while the rear derailleur upshift switch 12b is normally used for upshifting the rear derailleur 16. The rear derailleur mode switch 12c is used to change the switches 12a and 12b from a shifting mode to other modes including, but not limited to, a calibration mode for calibrating gear positions of the rear derailleur 16.

Figure 3:
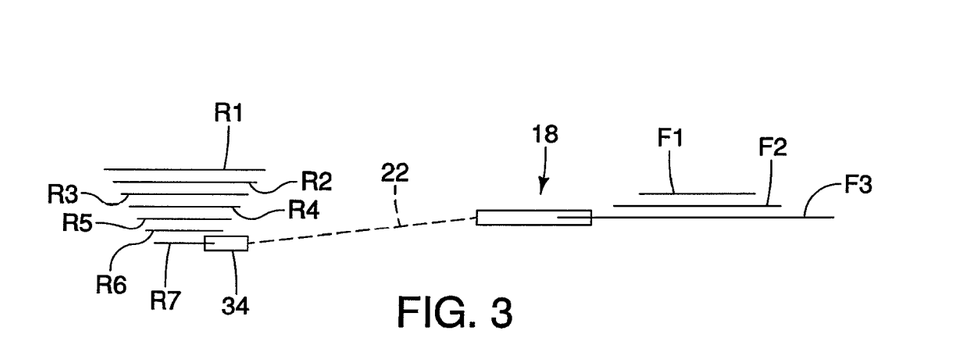
FIG. 3 is a schematic diagram showing one example of an arrangement of front and rear sprockets of the bicycle illustrated in FIG. 1.

As diagrammatically illustrated in FIG. 3, the bicycle 10 also includes a drive train having a set of rear sprockets R1 to R7 mounted to the rear axle of the rear wheel in a conventional manner, and a set of front sprockets F1 to F3 mounted to the crank axle in a conventional manner, with a chain 22 operatively coupled between the rear sprockets R1 to R7 and the front sprockets F1 to F3 in a conventional manner. The control devices 12 and 14 are operated by the rider in order to control movement (e.g., perform gear shifting operations) of the rear and front derailleurs 16 and 18 with respect to the rear sprockets R1 to R7 and the front sprockets F1 to F3, respectively.

Figure 4:
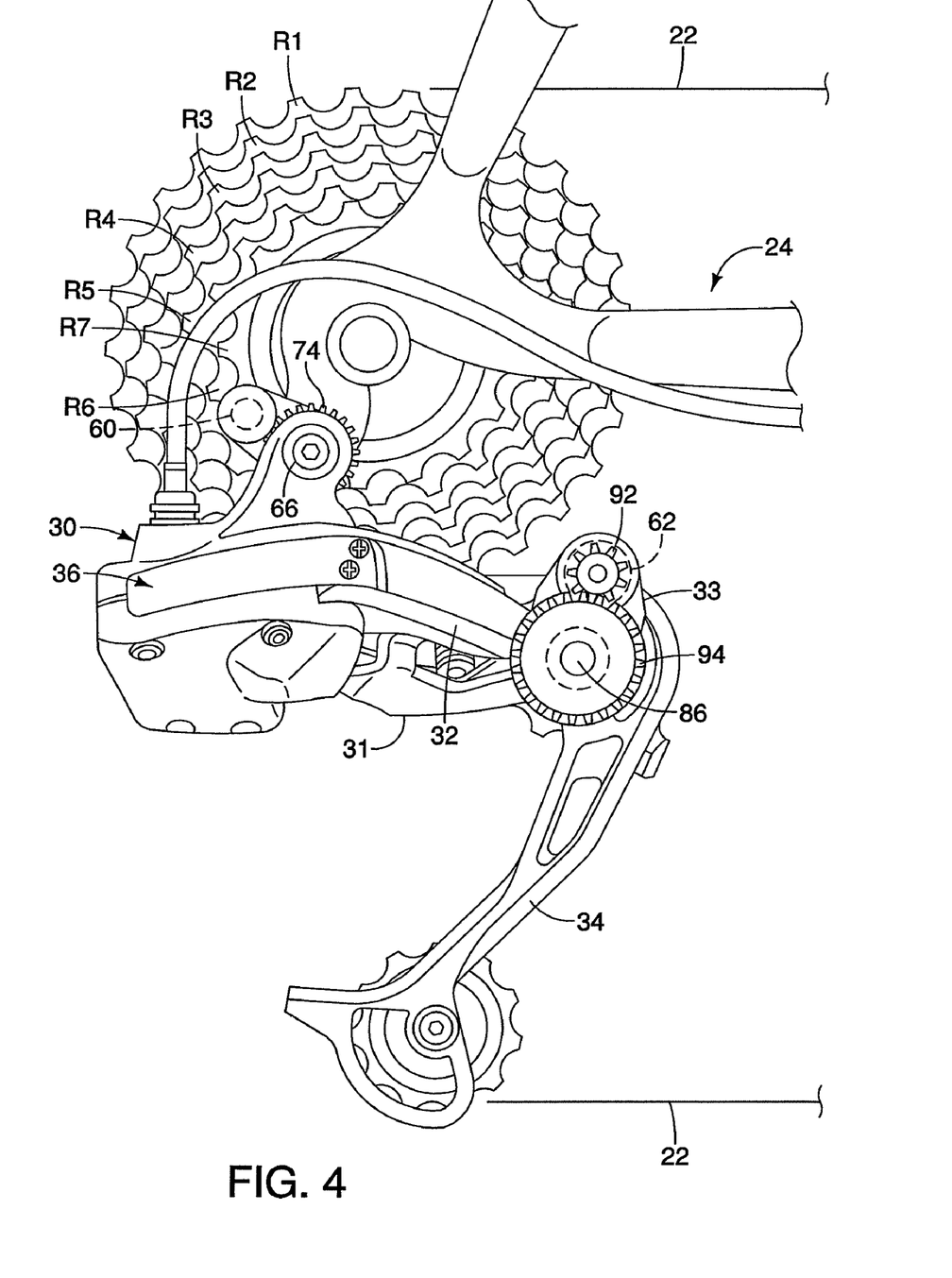
FIG. 4 is an enlarged side elevational view of the rear derailleur illustrated in FIG. 1 in a position corresponding to the chain engaging the largest rear sprocket.
Figure 5:
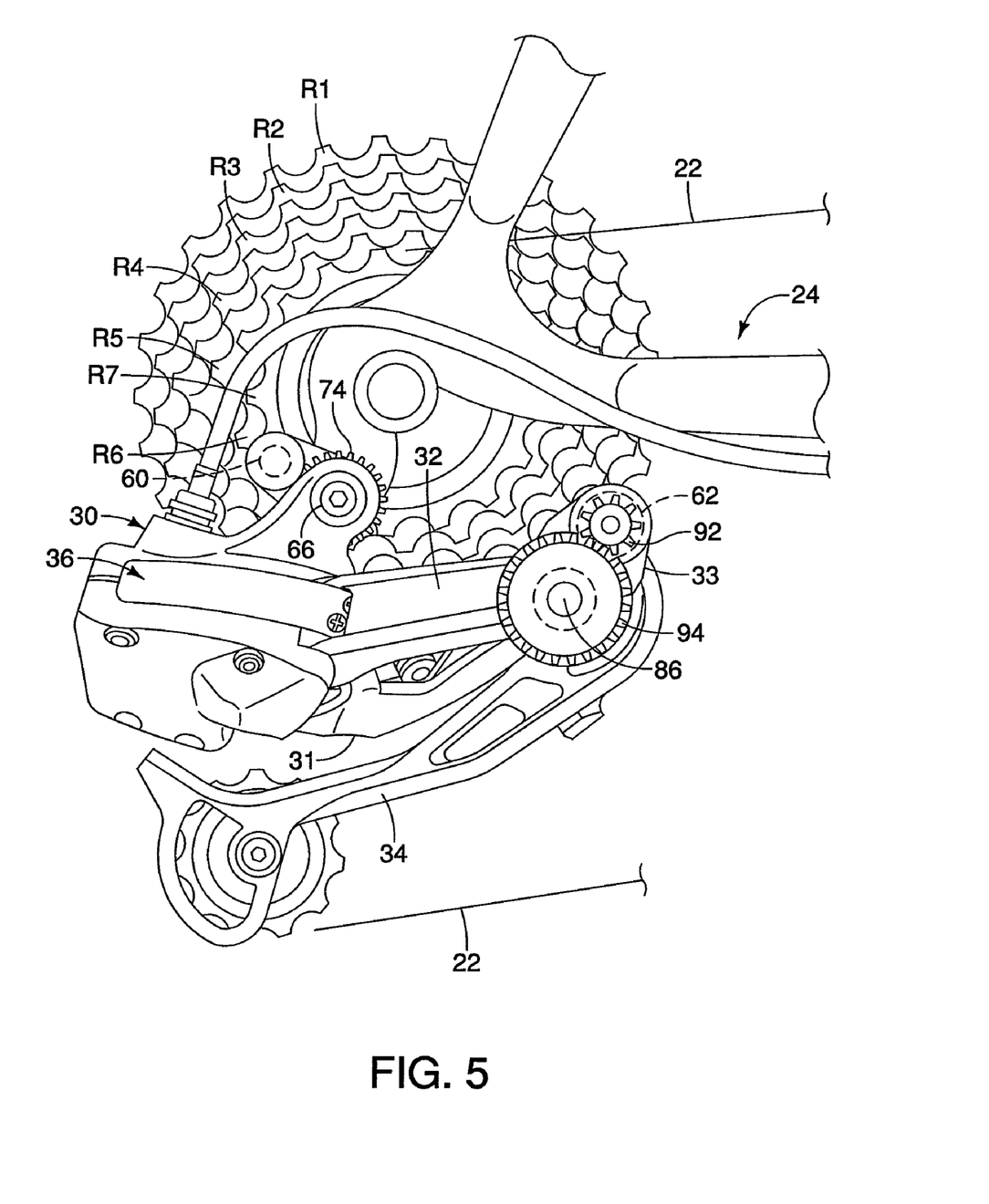
FIG. 5 is an enlarged side elevational view of the rear derailleur illustrated in FIG. 1 in a position corresponding to the chain engaging the smallest rear sprocket.

As seen in FIGS. 4 and 5, the rear derailleur 16 is mounted to a rear portion of a chain stay of a frame 24. The rear derailleur 16 is configured such that it can be controlled electrically. The rear derailleur 16 basically includes a base member 30, a first or inner link 31, a second or outer link 32, a movable member 33 and a chain guide 34. The base member 30, the inner link 31, the outer link 32, the movable member 33 and the chain guide 34 are pivotally coupled together to form a four-point linkage (connecting) mechanism. In other words, the links 31 and 32 have first ends pivotally coupled to the base member 30 and second ends pivotally coupled to the movable member 33 for moving the chain guide 34 laterally with respect to a center longitudinal plane of the bicycle 10. The chain guide 34 has a chain cage with two pulleys for receiving the chain 22. The chain cage of the chain guide 34 is also pivotally connected to the movable member 33 as explained below.

Figure 7:
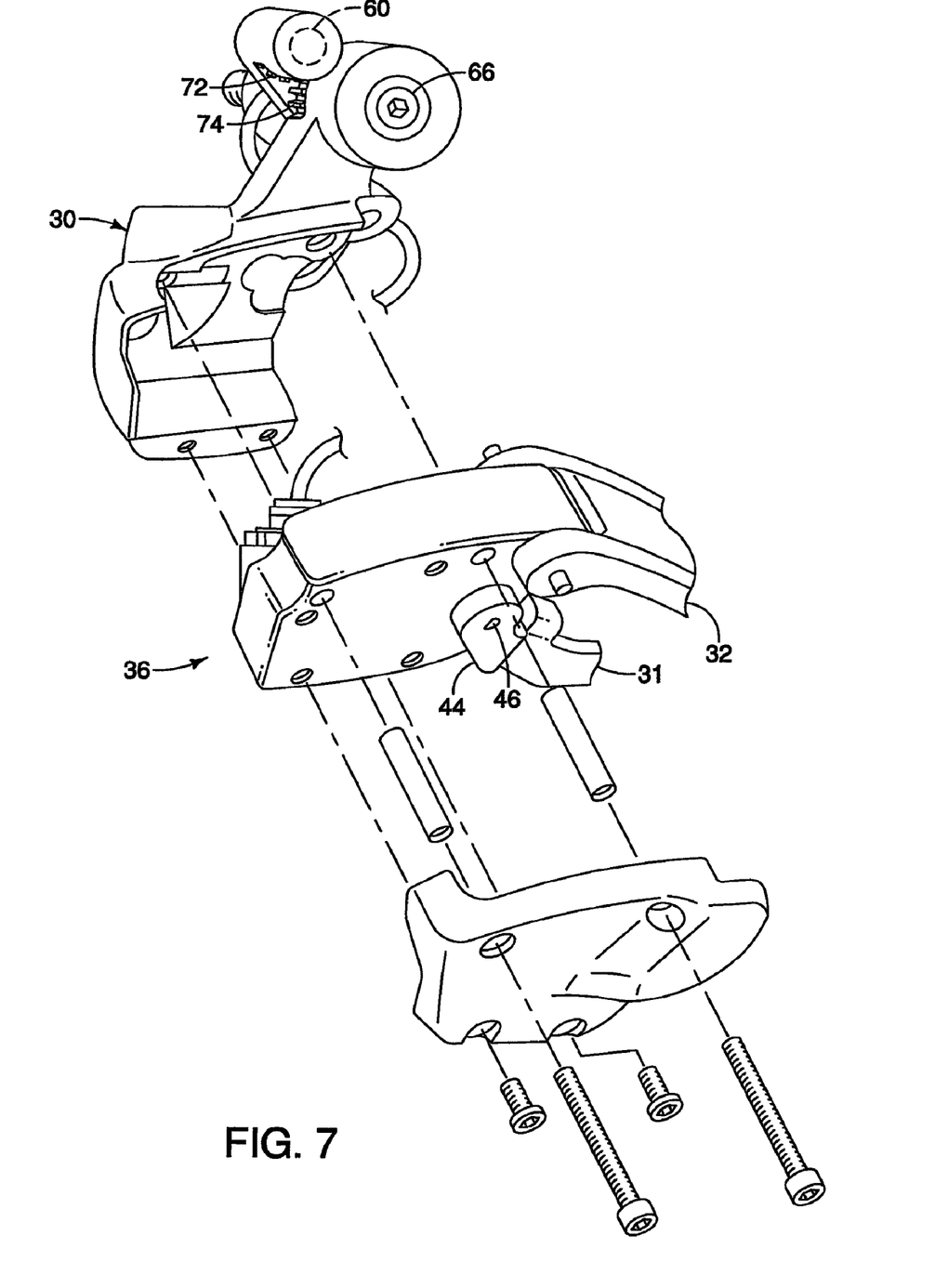
FIG. 7 is an exploded perspective view of the base member of the rear derailleur illustrated in FIG. 1.
Figure 8:
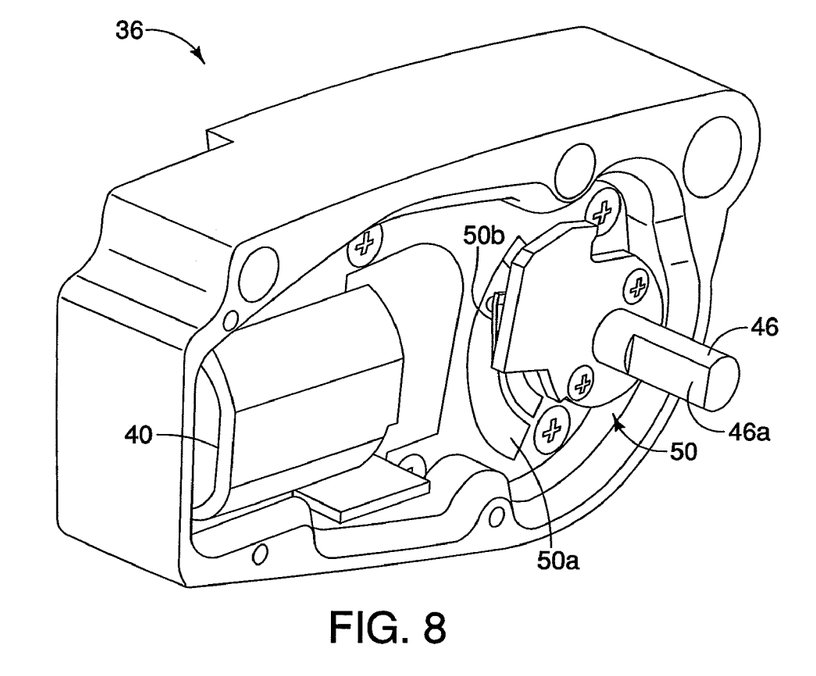
FIG. 8 is a perspective view of the motor unit for moving the linkage of the rear derailleur illustrated in FIG. 1, with the outside cover removed.
Figure 9:
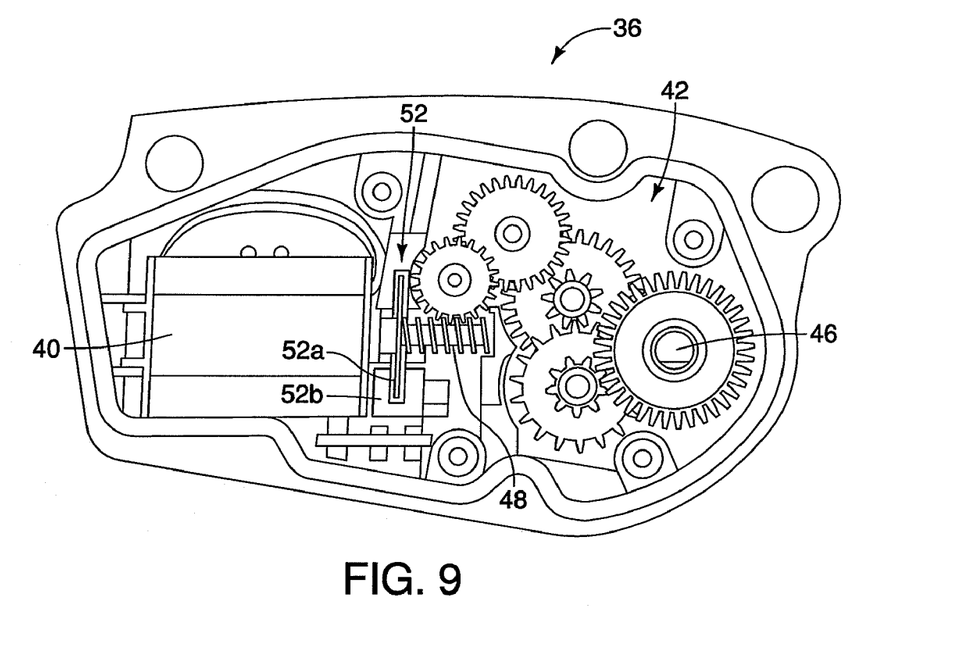
FIG. 9 is a side elevational view of the motor unit of the base member for moving the linkage of the rear derailleur illustrated in FIG. 1, with selected portions removed to show the drive train of the motor unit of the base member.

As seen in FIGS. 7 to 9, the rear derailleur 16 is provided with a motor or drive unit 36 that has a reversible electric motor 40 and a gear reduction arrangement 42. The motor 40 is electrically coupled to the controller 20 and to a power source (battery source or a generator) by electrical cords in a conventional manner. The motor 40 is operatively coupled to at least one of the links 31 and 32 for moving the movable member 33 and the chain guide 34 laterally with respect to the center longitudinal plane of the bicycle 10. In this embodiment, the inner link 31 is non-rotatably fixed to the pivot pin 46 by a flat side 46a at its first end 44. The inner link 31 is rotated by the motor 40 via the gear reduction arrangement 42. Thus, the links 31 and 32 form a moving mechanism for moving the movable member 33 and the chain guide 34 laterally with respect to the center longitudinal plane of the bicycle 10 with the motor (drive) unit 36 operatively coupled to at least one of the links 31 and 32.

The gear reduction arrangement 42 includes a series of gears that are meshed together such that the angular velocity of the output shaft (pivot pin) 46 is reduced compared to the angular velocity of an output shaft 48 of the motor 40. Preferably, the motor (drive) unit 36 is provided with a position detecting device that includes an analog position sensor 50 and a digital position sensor 52 to determine the position and the amount of angular movement of the output shaft (pivot pin) 46 by the motor 40.

The analog position sensor 50 is mounted around the output shaft 46 of the gear reduction arrangement 42. The output shaft 48 of the motor 40 is provided with the digital position sensor 52. The position sensors 50 and 52 are electrically coupled to the controller 20 to provide positioning information for energizing the motor 40 to the correct position for each gear position. The position detecting device (e.g., the position sensors 50 and 52) form a rear derailleur position control mechanism for locating the lateral position of the chain guide 34 over one of the rear sprockets R1 to R7. In other words, position detecting device (e.g., the position sensors 50 and 52) is arranged to detect a change in relative movement of the movable member 33 with respect to the base member 30 due to operation of the motor 40. The analog position sensor 50 is preferably a potentiometer that includes a stationary electrical contact 50a and a movable electrical brush 50b.

The analog position sensor 50 forms a mechanical/electrical position sensing device for detecting a current absolute value of positioning (rotational) angle of at least one of the movable parts of the motor unit 36. The digital position sensor 52 forms a digital position sensing device for detecting both a movement (rotational) direction of the movable parts of the motor unit 36, and an amount of rotational movement of at least one of the movable parts of the motor unit 36. The microcomputer of the controller 20 receives signals from the position sensors 50 and 52 for determining the gear position and the driving amount of the rear derailleur 16 during calibration and/or shifting.

The movable electrical brush 50b is mounted on the output shaft 46 to rotate therewith such that the movable electrical brush 50b slides along the stationary electrical contact 50a when the output shaft 46 is rotated in response to operation of the motor 40. The analog position sensor 50 outputs an analog or mechanical signal that is sent to the controller 20 to indicate the current position of the drive train of the motor unit 36. Since the output shaft 46 engages the link 31, the lateral position of the chain guide 34 can be determined based on the output signals from the analog position sensor 50.

The digital position sensor 52 is formed by a position sensor element or shutter wheel 52a and a photo interrupter 52b. The photo interrupter 52b is preferably a dual channel photo interrupter having a light source or LED disposed on one side of the shutter wheel 52a and a light detector such as a phototransistor disposed on the other side of the shutter wheel 52a. The shutter wheel 52a is mounted on the output shaft 48 of the motor 40 so that the shutter wheel 52a rotates with the output shaft 48 of the motor 40. This rotation of the shutter wheel 52a by the motor 40 causes the passage of light of LED to phototransistor to be intermittently blocked, thus producing a digital signal having a period determined by the rate of rotation of the shutter wheel 52a. Thus, the shape of the digital signal typically will have square or rectangular saw tooth configuration with each of the pulses representing one of a plurality of angular positions of the output shaft 48. Since the photo interrupter 52b has two channels, the two digital signals will be produced by the photo interrupter 52b that are out of phase with each other. Thus, the digital position sensor 52 functions as an intermittent optical sensor that can detect both the rotational direction and the angular position of the output shaft 48 of the drive train of the motor 40. The digital position sensor 52 sends a position signal indicative of an angular position and rotational direction of the output shaft 48 to the controller 20.

The analog position sensor 50 acting as a potentiometer is suitable for detecting an absolute value of positioning angle (positioning) of the drive train of the motor 40 when the motor 40 stops rotating (stationary). In the other hand, the photo interrupter of the digital position sensor 52 is suitable for detecting a value of rotating and a rotating direction. By using two types of sensors 50 and 52, it is possible to maintain a correct and stable gear shifting position for the rear derailleur 16.

The controller 20 cooperates together with the position sensors 50 and 52 to constitute a bicycle component position correcting device in which the microprocessor acting as a comparison unit compares the current absolute value of the positioning angle of the drive train (movable parts) of the motor unit 36 to a pre-stored reference value of the positioning angle of the drive train (movable parts) of the motor unit 36 in response to a derailleur gear shift command.

Referring back to FIGS. 4 and 5, the rear derailleur 16 is preferably provided with a reversible electric motor 60 for pivoting the base member 30 with respect to the frame 24 and a reversible electric motor 62 for pivoting the chain guide 34 with respect to the movable member 33. The motors 60 and 62 form the basic components of an angular adjustment arrangement of the rear derailleur 16. The motors 60 and 62 are electrically coupled to the controller 20, which selectively energizes the motors 60 and 62 to correctly adjust the position of the chain guide 34 for gear position of the rear derailleur 16. Preferably, the motors 60 and 62 are synchronized with the motor 40 such that all three motors 40, 60 and 62 act simultaneously. However, the motors 40, 60 and 62 can be operated the sequentially or with various different sequences as needed and/or desired. In any event, each of the motors 40, 60 and 62 are preferably operated each time a shifting operation occurs.

Figure 6:
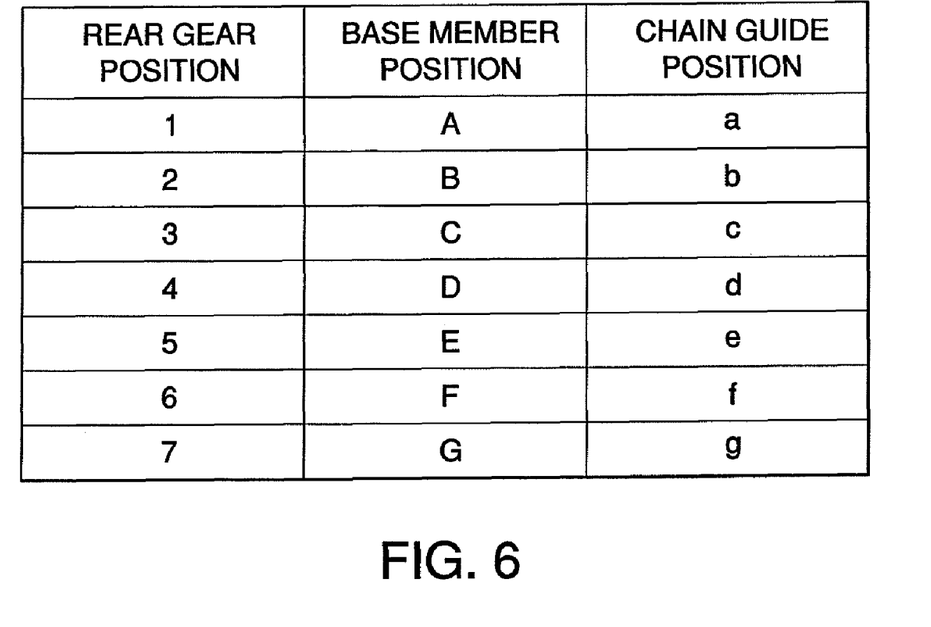
FIG. 6 is a table illustrating one example of initial values stored in the memory of the controller at the factory for a particular component group.

As seen in FIG. 6, the operation amounts of the motors 60 and 62 are pre-stored in memory of the controller 20. For example, as seen in FIG. 6, for each gear position of the rear derailleur 16, the base member 30 has a different pre-stored angular position with respect to the frame 24, and the chain guide 34 has a different pre-stored angular position with respect to the movable member 33. The operation amounts of the motors 60 and 62 can be set in a variety of ways. For example, the operation amounts of the motors 60 and 62 can be set based on a manufacturer's model for a rear sprocket cassette. Alternatively, the operation amounts of the motors 60 and 62 can be set by inputting the number of sprockets and the number of teeth per sprocket. The operation of and function of the motors 60 and 62 will be discussed in more detail later.

Referring now to FIGS. 10 to 13, the base member 30 includes a first support portion 64 and a first or B-axle 66. The support portion 64 is fastened to a hanger portion of a chain stay of the frame 24 by the B-axle 66. In this embodiment, the B-axle 66 is a bolt that threads into the hanger portion of the frame 24. The support portion 64 is pivotally mounted on the B-axle 66 such that the relative position of the rear derailleur 16 can be adjusted with respect to the frame 24. In particular, the base member 30 is provided with a stopper plate 68 that supports the motor 60 with a gear reduction arrangement 70 and a drive gear 72. The motor 60, the gear reduction arrangement 70 and the drive gear 72 constitutes a motor or drive unit. The motor 60 is electrically coupled to the controller 20, which selectively energizes the motor 60 to turn or rotate the support portion 64 on the B-axle 66 with respect to the frame 24.

Figure 11:
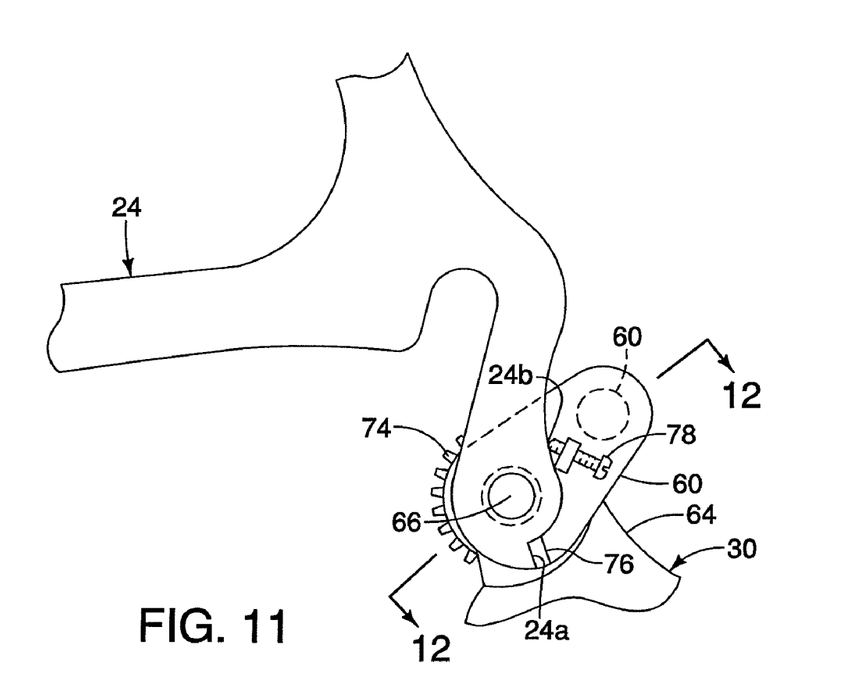
FIG. 11 is an inside side elevational view of the part of the angular adjustment arrangement for the base member illustrated in FIG. 10.

Specifically, as seen in FIG. 11, a driven gear 74 is fixedly mounted to the support portion 64 with a center axis of the driven gear 74 being coincident with center axis of the B-axle 66. The driven gear 74 and the support portion 64 rotate together as a unit on the B-axle 66 when the driven gear 74 is turned. The driven gear 74 has teeth that mesh with teeth of the drive gear 72. Thus, operation of the motor 60 rotates the drive gear 72 via the gear reduction arrangement 70 so that the drive gear 72 rotates at the appropriate angular velocity. Rotation of the drive gear 72 rotates the driven gear 74, which also results in the support portion 64 rotating about the B-axle 66. The operation of the motor 60 is controlled by an electrical signal from the controller 20, which selectively energizes the motor 60. As explained below, the rotational movement (i.e., amount of angular movement and direction of rotation) of the support portion 64 with respect to the frame 24 is preferably synchronized with the gear shifting operation performed by operating the control device 12 (e.g., pushing either the downshift switch 12a or the upshift switch 12b).

Figure 10:
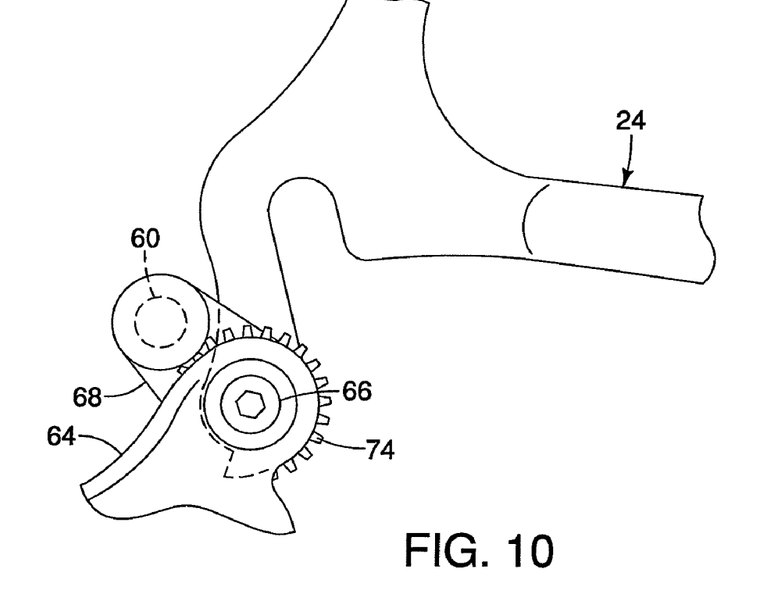
FIG. 10 is an outside elevational view of a part of the angular adjustment arrangement for the base member.

As best seen in FIGS. 10 and 11, the stopper plate 68 is designed to be used with a conventional hanger of a bicycle frame. The stopper plate 68 is disposed on the B-axle 66 between the hanger of the frame 24 and the support portion 64 of the base member 30. The stopper plate 68 remains stationary with respect to the frame 24. In particular, the stopper plate 68 has an abutment tab 76 and a fixing screw 78. The abutment tab 76 abuts a first abutment part 24a of the hanger of the frame 24, while the fixing screw 78 abuts a second abutment part 24b of the hanger of the frame 24 to prevent rotational movement of the stopper plate 68 about the B-axle 66.

Figure 12:
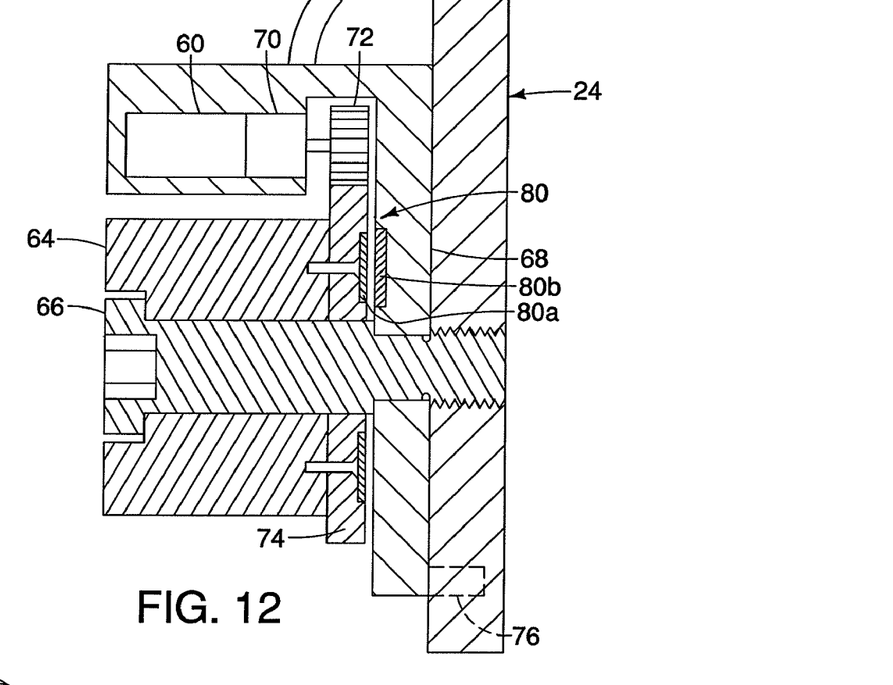
FIG. 12 is a cross sectional view of the part of the angular adjustment arrangement for the base member illustrated in FIGS. 10 and 11 as seen along section line 12-12 of FIG. 11.
Figure 13:
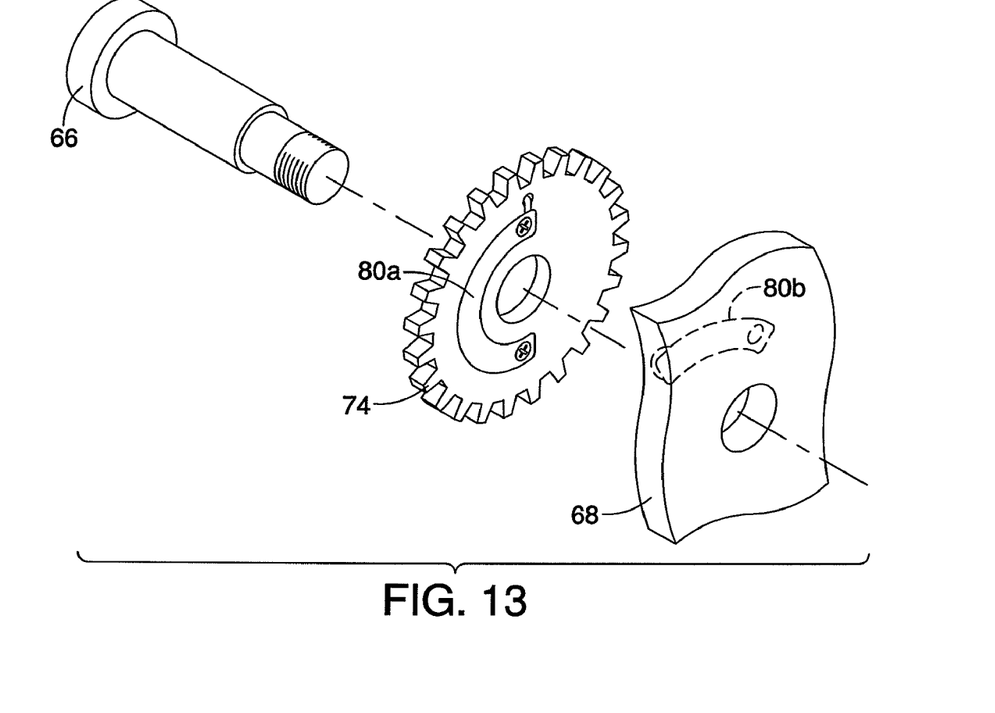
FIG. 13 is an exploded perspective view of selected parts of the angular adjustment arrangement for the base member illustrated in FIGS. 10 to 12.

As seen in FIGS. 12 and 13, a position detecting device in the form of an analog position sensor 80 is provided between the stopper plate 68 and the driven gear 74. In particular, the position detecting device determines the amount of angular movement of the support portion 64 of the base member 30 with respect to the frame 24 by operation of the motor 60. The analog position sensor 80 is mounted around the B-axle 66. The position sensor 80 is electrically coupled to the controller 20 to provide angular movement information for supplying power to energize the motor 60 to turn the support portion 64 to the correct position for each gear position.

The analog position sensor 80 is preferably a potentiometer that includes a movable electrical contact 80a and a stationary electrical brush 80b. The movable electrical contact 80a is mounted on the driven gear 74 to rotate therewith, while the stationary electrical brush 80b is mounted on the stopper plate 68. The stationary electrical brush 80b is cantilevered with respect to the stopper plate 68 and contacts the movable electrical contact 80a such that the stationary electrical brush 80b slides along the movable electrical contact 80a when the driven gear 74 is rotated in response to operation of the motor 60. The analog position sensor 80 outputs an analog or mechanical signal that is sent to the controller 20 to indicate the current angular position of the support portion 64 about the B-axle 66.

Figure 14:
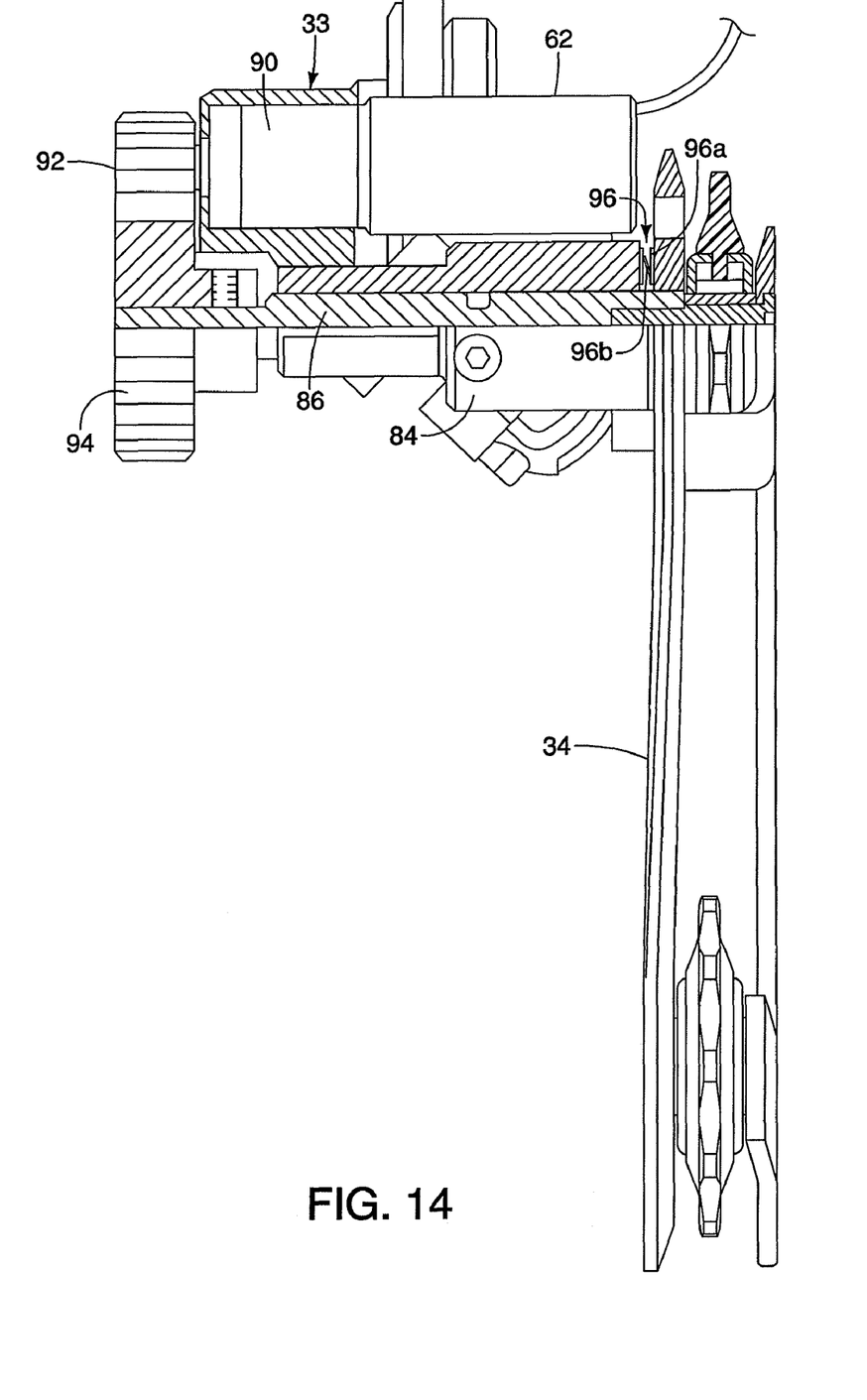
FIG. 14 is a front end elevational view of the rear derailleur with portions of the movably member and portions of the angular adjustment arrangement for the chain guide shown in cross section.

As seen in FIG. 14, the movable member 33 includes a second support portion 84 and a second or P-axle 86. The chain guide 34 being pivotally mounted on the support portion 84 by the P-axle 86 such that the relative position of the chain guide 34 can be adjusted with respect to the support portion 84. In particular, the chain cage of the chain guide 34 is non-rotatably fixed to one end of the P-axle 86 of the movable member 33 such that the chain guide 34 and the P-axle 86 rotate together as a unit when the motor 62 is operated by the controller in response to operation of the control device 12 (e.g., pushing either the switch 12a or the switch 12b). In particular, the support portion 84 of the movable member 33 supports the motor 62, which is operatively coupled to a gear reduction arrangement 90 and a drive gear 92. The motor 62, the gear reduction arrangement 90 and the drive gear 92 constitutes a motor or drive unit. The motor 62 is electrically coupled to the controller 20, which selectively energizes the motor 62 to turn or rotate the P-axle 86 and the chain guide 34 can be adjusted with respect to the support portion 84.

Specifically, as seen in FIG. 14, a driven gear 94 is fixedly mounted to one of the ends of the P-axle 86. The driven gear 94 and the P-axle 86 rotate together as a unit on the support portion 84 when the driven gear 94 is turned by the operation of the motor 62. The driven gear 94 has teeth that mesh with teeth of the drive gear 92. Thus, operation of the motor 62 rotates the drive gear 92 via the gear reduction arrangement 90 so that the drive gear 92 rotates at the appropriate angular velocity. Rotation of the drive gear 92 rotates the driven gear 94, which also results in the P-axle 86 rotating within a recess of the support portion 84. The operation of the motor 62 is controlled by an electrical signal from the controller 20, which selectively energizes the motor 62. The rotational movement (i.e., amount of angular movement and direction of rotation) of the chain guide 34 with respect to the support portion 84 is preferably synchronized with the gear shifting operation performed by operating the control device 12 (e.g., pushing either the switch 12a or the switch 12b).

The motor or drive unit of the chain guide 34 is also provided with a position detecting device in the form of an analog position sensor 96. The analog position sensor 96 is provided between the support portion 84 and the chain cage of the chain guide 34. In particular, the position detecting device determines the amount of angular movement of the chain guide 34 with respect to the support portion 84 by operation of the motor 62. The analog position sensor 96 is mounted around the P-axle 86. The position sensor 96 is electrically coupled to the controller 20 to provide angular movement information for supplying power to energize the motor 62 to turn the chain guide 34 to the correct position for each gear position.

The analog position sensor 96 is preferably a potentiometer that includes a movable electrical contact 96a and a stationary electrical brush 96b. The movable electrical contact 96a is mounted on the chain cage of the chain guide 34 to rotate therewith, while the stationary electrical brush 96b is mounted on the support portion 84. The stationary electrical brush 96b is cantilevered with respect to the support portion 84 and contacts the movable electrical contact 96a such that the stationary electrical brush 96b slides along the movable electrical contact 96a when the driven gear 94 is rotated in response to operation of the motor 62. The analog position sensor 96 outputs an analog or mechanical signal that is sent to the controller 20 to indicate the current angular position of the chain guide 34.

The electronic controller 20 is a processing device that preferably includes a display, a microcomputer and a position correction program for correcting the positions of the chain guide 34 using the motors 40, 60 and 62. The electronic controller 20 can also include other conventional components such as an input interface circuit, an output interface circuit, and storage devices such as a ROM (Read Only Memory) device and a RAM (Random Access Memory) device. The internal RAM of the electronic controller 20 stores statuses of various control data from the position detecting devices. The internal ROM of the electronic controller 20 stores the predetermined parameter for various shifting operations. Since electronic controllers are well known in the bicycle field, the electronic controller 20 will not be discussed and/or illustrated in detail herein General Interpretation of Terms In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur comprising:
   a base member including a first support portion and a first axle with the first support portion being pivotally mounted on the first axle;
   a movable member including a second support portion, a chain guide and a second axle with the chain guide being pivotally mounted on the second support portion by the second axle;
   a moving mechanism coupled between the first and second support portions; and
   an angular adjustment arrangement operatively coupled to at least one of the base member and the movable member, the angular adjustment arrangement being electrically operated such that the angular adjustment arrangement performs at least one of electrically pivoting the first support portion relative to the first axle and maintaining the first support portion in a pre-stored angular position based on a pre-stored operation amount of the angular adjustment arrangement, and electrically pivoting the chain guide relative to the second support portion and maintaining the chain guide in a pre-stored angular position based on a pre-stored operation amount of the angular adjustment arrangement when the moving mechanism is moved to move the second support portion of the movable member relative to the first support portion of the base member.

2. The bicycle rear derailleur according to claim 1, wherein the moving mechanism includes a pair of links with a drive unit operatively coupled to at least one of the links.

3. The bicycle rear derailleur according to claim 2, wherein the drive unit includes an electric motor.

4. The bicycle rear derailleur according to claim 3, wherein the drive unit further includes a position detecting device that is arranged to detect a change in relative movement of the second support portion of the movable member with respect to the first support portion of the base member due to operation of the motor.

5. The bicycle rear derailleur according to claim 1, wherein the angular adjustment arrangement includes an electric motor.

6. The bicycle rear derailleur according to claim 5, wherein the electric motor is operatively coupled to pivot the first support portion of the base member relative to the first axle.

7. The bicycle rear derailleur according to claim 6, wherein the angular adjustment arrangement further includes a position detecting device that is arranged to detect a change in relative movement of the first support portion of the base member with respect to the first axle of the base member due to operation of the motor.

8. The bicycle rear derailleur according to claim 6, wherein the moving mechanism includes a pair of links with a drive unit operatively coupled to at least one of the links.

9. The bicycle rear derailleur according to claim 8, wherein the drive unit includes an electric motor.

10. The bicycle rear derailleur according to claim 1, wherein
the angular adjustment arrangement includes an electric motor that is operatively coupled to pivot the chain guide relative to the second support portion of the movable member.

11. The bicycle rear derailleur according to claim 10, wherein
the angular adjustment arrangement further includes a position detecting device that is arranged to detect a change in relative movement of the first support portion of the base member with respect to the first axle of the base member due to operation of the motor.

12. The bicycle rear derailleur according to claim 10, wherein
the moving mechanism includes a pair of links with a drive unit operatively coupled to at least one of the links.

13. The bicycle rear derailleur according to claim 12, wherein
the drive unit includes an electric motor.

14. A bicycle rear derailleur comprising:
a base member including a first support portion and a first axle with the first support portion being pivotally mounted on the first axle;
a movable member including a second support portion, a chain guide and a second axle with the chain guide being pivotally mounted on the second support portion by the second axle;
a moving mechanism coupled between the first and second support portions; and
an angular adjustment arrangement including an electric motor and a gearing arrangement, the electric motor being operatively coupled to electrically pivot the first support portion relative to the first axle when the moving mechanism is moved to move the second support portion of the movable member relative to the first support portion of the base member, the gearing arrangement including a driven gear mounted on the first support portion of the base member for rotating the first support portion of the base member relative to the first axle.

15. A bicycle rear derailleur comprising:
a base member including a first support portion and a first axle with the first support portion being pivotally mounted on the first axle;
a movable member including a second support portion, a chain guide and a second axle with the chain guide being pivotally mounted on the second support portion by the second axle, the chain guide being non-rotatably fixed to the second axle of the movable member such that the chain guide and the second axle rotate together;
a moving mechanism coupled between the first and second support portions; and
an angular adjustment arrangement including an electric motor and a gearing arrangement, the electric motor being operatively coupled to electrically pivot the chain guide relative to the second support portion of the movable member when the moving mechanism is moved to move the second support portion of the movable member relative to the first support portion of the base member, the gearing arrangement including a driven gear mounted on the second axle of the movable member for rotating the chain guide relative to the second support portion of the movable member.

16. A bicycle rear derailleur comprising:
a base member including a first support portion and a first axle with the first support portion being pivotally mounted on the first axle;
a movable member including a second support portion, a chain guide and a second axle with the chain guide being pivotally mounted on the second support portion by the second axle;
a moving mechanism coupled between the first and second support portions, the moving mechanism including a pair of links with a first electric motor operatively coupled to at least one of the links; and
an angular adjustment arrangement including a second electric motor that is operatively coupled to pivot the first support portion of the base member relative to the first axle, and a third electric motor that is operatively coupled to pivot the chain guide relative to the second support portion of the movable member when the moving mechanism is moved to move the second support portion of the movable member relative to the first support portion of the base member.

17. A bicycle rear derailleur comprising:
a base member including a first support portion and a first axle with the first support portion being pivotally mounted on the first axle;
a movable member including a second support portion, a chain guide and a second axle with the chain guide being pivotally mounted on the second support portion by the second axle;
a moving mechanism coupled between the first and second support portions; and
an angular adjustment arrangement operatively coupled to at least one of the base member and the movable member, the angular adjustment arrangement being electrically operated with the bicycle rear derailleur being in an uninstalled position such that the angular adjustment arrangement performs at least one of
electrically pivoting and holding the first support portion relative to the first axle in different angular positions, and
electrically pivoting and holding the chain guide relative to the second support portion in different angular positions
when the moving mechanism is moved to move the second support portion of the movable member relative to the first support portion of the base member.

* * * * *